(12) United States Patent
Yang et al.

(10) Patent No.: US 9,612,624 B2
(45) Date of Patent: Apr. 4, 2017

(54) DETACHABLE TOUCH NOTEBOOK COMPUTER

(71) Applicant: WISTRON CORPORATION, New Taipei (TW)

(72) Inventors: Ching-Pin Yang, New Taipei (TW); Che-Wen Liu, New Taipei (TW)

(73) Assignee: Wistron Corporation, New Taipei (TW)

(*) Notice: Subject to any disclaimer, the term of this patent is extended or adjusted under 35 U.S.C. 154(b) by 90 days.

(21) Appl. No.: 14/459,554

(22) Filed: Aug. 14, 2014

(65) Prior Publication Data

US 2015/0160700 A1    Jun. 11, 2015

(30) Foreign Application Priority Data

Dec. 10, 2013  (TW) .............................. 102145319 A

(51) Int. Cl.
*G06F 1/16*    (2006.01)
(52) U.S. Cl.
CPC ............ *G06F 1/1669* (2013.01); *G06F 1/162* (2013.01); *G06F 1/1637* (2013.01)

(58) Field of Classification Search
CPC ....... G06F 1/1669; G06F 1/162; G06F 1/1637
USPC .......................... 361/679.17, 679.09, 679.01
See application file for complete search history.

(56) References Cited

U.S. PATENT DOCUMENTS 7,652,873 B2 *   1/2010   Lee ...................... E05B 65/006
                                                        248/917

* cited by examiner

*Primary Examiner* — Tuan T Dinh
*Assistant Examiner* — Rockshana Chowdhury
(74) *Attorney, Agent, or Firm* — Rosenberg, Klein & Lee

(57) ABSTRACT

The present disclosure provides a detachable touch notebook computer, which comprises a touch tablet, a connector, and a keyboard dock. The connector has an interlocking structure and a latch, at which the interlocking structure is pivoted. The keyboard dock has a positioning member disposed at the latch. Thereby, the touch tablet can be disposed on the keyboard dock and forming the touch notebook computer. According to the touch notebook computer of the present disclosure, the interlocking structure is driven by rotating the touch tablet. Then the interlocking structure drives the latch to move, enabling the positioning member to come off from the latch and thus detaching the touch tablet from the keyboard dock.

15 Claims, 12 Drawing Sheets

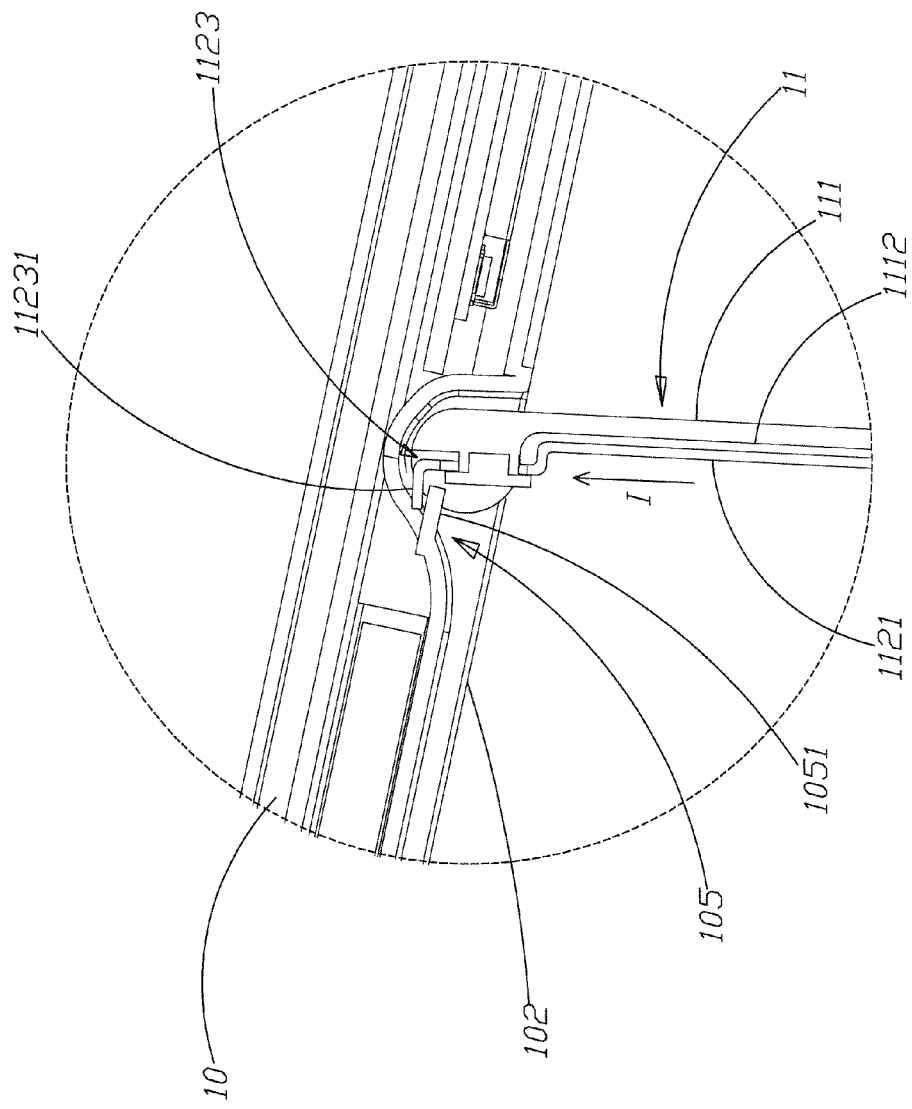

DETACHABLE TOUCH NOTEBOOK COMPUTER

FIELD OF THE DISCLOSURE

The present disclosure relates generally to a touch notebook computer, and particularly to a detachable touch notebook computer.

BACKGROUND OF THE DISCLOSURE

As technologies evolve, touch tablets are developed in the market. Touch tablets have light and thin shapes, similar to the designs of liquid crystal displays. In addition, the displays of touch tablets are touch screens, allowing operations by input commands given thereon. When a user operates a touch tablet and needs to input text or symbols, the touch screen of the touch tablet shows a software keyboard emulating a physical keyboard device. The user can touch the icons on the software keyboard for inputting the corresponding text or symbols. As a consequence, text or symbols can be input to a touch tablet directly without the need of connecting to a keyboard device.

Although touch tablets have the advantages of compact size, requiring no external keyboard device, and ease of portability, users of general personal computers or notebook computers are still unable to adapt to inputting text or symbols using touch screens. Thereby, many users will prepare an additional external keyboard device connected to their touch tablets and place touch tablets on supporting objects such as bookstands for supporting touch tablets. That is to say, the touch screen of a touch tablet is used as a general display, and the external keyboard device is used for inputting text or symbols. Besides, the external keyboard device can be connected to the touch tablet via a universal serial bus (USB) or be connected wirelessly to the touch tablet via a wireless transmission module.

Moreover, there are touch notebook computers integrating a touch tablet and a keyboard device currently. Although the touch tablet is detachable from the keyboard device, it is difficult to disassemble the touch tablet from the keyboard device.

SUMMARY

An objective of the present disclosure is to provide a touch notebook computer having simple structures and achieving the effect of easy assembling and disassembling.

In order to achieve the objective and effect described above, the present disclosure discloses a detachable touch notebook computer, which comprises a keyboard dock, a positioning member, a touch tablet, a connector, and a latch. The positioning member is pivoted on one side of the keyboard dock. The touch tablet is assembled on the keyboard dock and having an accommodating recess, which includes an activation part. The connector has a first end and a second end. The first end is pivoted at the accommodating recess of the touch tablet and includes an interlocking structure. The interlocking has a driving part corresponding to the activation part. The latch is disposed at the second end of the connector and connected with the interlocking structure. The positioning member is disposed at the latch. The touch tablet rotates with respect to the connector; the activation part activates the driving part; the driving part drives the interlocking structure; the interlocking structure drives the latch; the positioning member comes off from the latch; and the touch tablet is detached from the keyboard dock.

BRIEF DESCRIPTION OF THE DRAWINGS

FIGS. 7A to 7D show schematic diagrams of detaching the touch tablet from the keyboard dock according to the present disclosure.

DETAILED DESCRIPTION

In order to make the structure and characteristics as well as the effectiveness of the present disclosure to be further understood and recognized, the detailed description of the present disclosure is provided as follows along with embodiments and accompanying figures.

It is uneasy to disassemble the touch tablet from a touch notebook computer according to the prior art. Accordingly, the present disclosure provides a detachable touch notebook computer, which uses a connector to connect to a touch tablet and a keyboard dock. The connector and the keyboard dock are fixed by a latch. The latch disengages the fixed status between the connector and the keyboard dock via a simple interlocking structure for detaching the touch tablet from the keyboard dock. Thereby, assembling and disassembling can be done with ease and thus solving the problems described above.

Figure 1A:
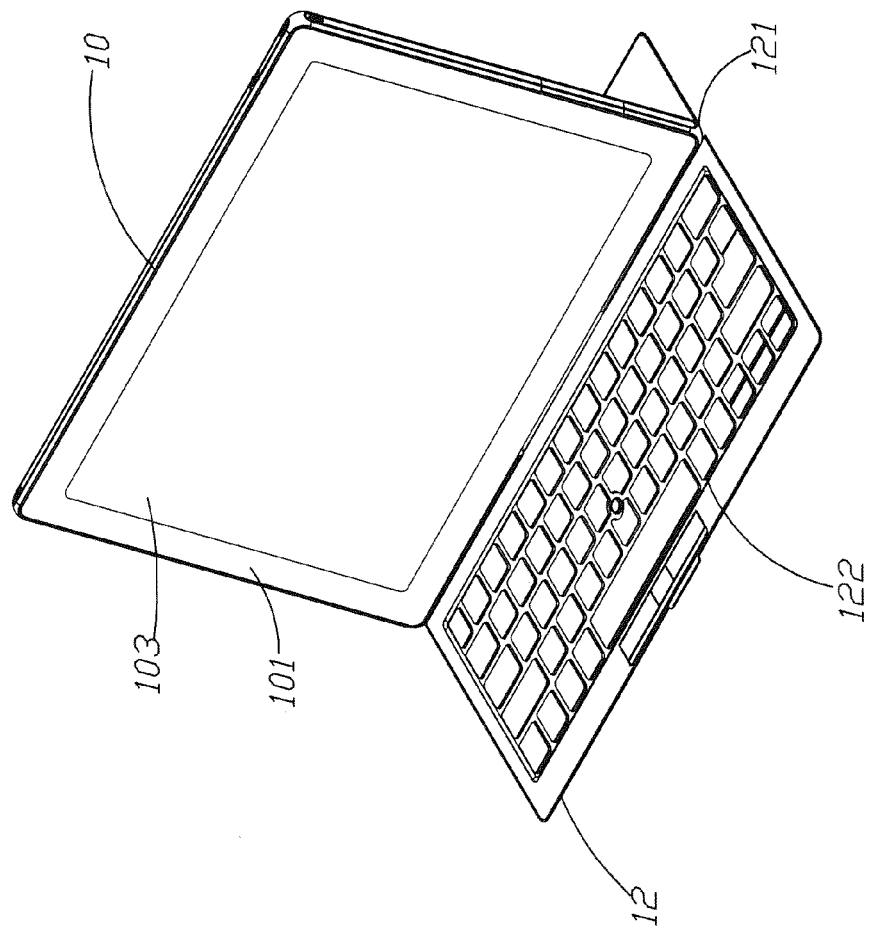
FIG. 1A shows a three-dimensional view of the touch notebook computer according to the first embodiment of the present disclosure.
Figure 1B:
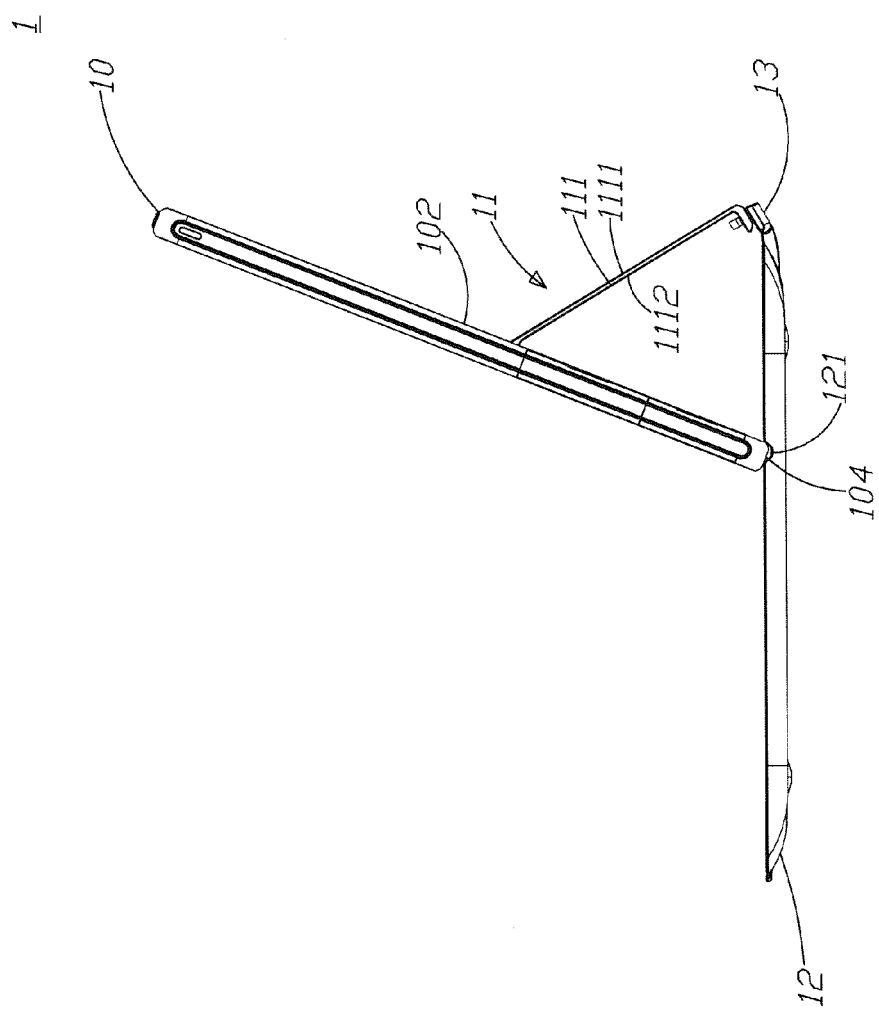
FIG. 1B shows a side view of the touch notebook computer according to the first embodiment of the present disclosure.

Please refer to FIG. 1A and FIG. 1B, which show a three-dimensional view and a side view of the touch notebook computer according to the first embodiment of the present disclosure. As shown in the figures, the present embodiment provides a touch notebook computer 1, which comprises a touch tablet 10, a connector 11, and a keyboard dock 12. The touch tablet 10 is assembled on the keyboard dock 12 with its bottom part wedged to at least a fixing part 121 of the keyboard dock 12 for avoiding sliding on the keyboard dock 12. The fixing part 121 of the present embodiment is a groove. Alternatively, the fixing part 121 can be a projective bar or other fixing means capable o blocking the touch tablet 10 from sliding on the keyboard dock 12. Besides, a keyboard 122 or another input device is disposed on the surface of the keyboard dock 12 having the fixing part 121. Signal transmission between the keyboard 122 of the keyboard dock 12 and the touch tablet 10 can be performed by wired transmission, such a USB, or wireless transmission, such as infrared or the Bluetooth, so that the keyboard 122 can be used for controlling the content displayed on the touch tablet 10. In addition, the touch tablet 10 can be disassembled from the keyboard dock 12 for application. According to the touch notebook computer 1 of the present embodiment. the touch tablet 10 is rotated for separating the connector 11 from the keyboard dock 12 and thus detaching the touch tablet 10 from the keyboard dock 12. The touch tablet 10 can be, but not limited to, a tablet computer, a smartphone, or a personal digital assistant (PDA). A person having ordinary skill in the art can also embody the touch tablet 10 to a computer system configuration such as hand-held devices, portable devices, PDAs, microprocessor-based or programmable consumer electronics, and other similar equipment. In the following, the structure of the touch notebook computer 1 according to the present embodiment will be described in detail.

Figure 2:
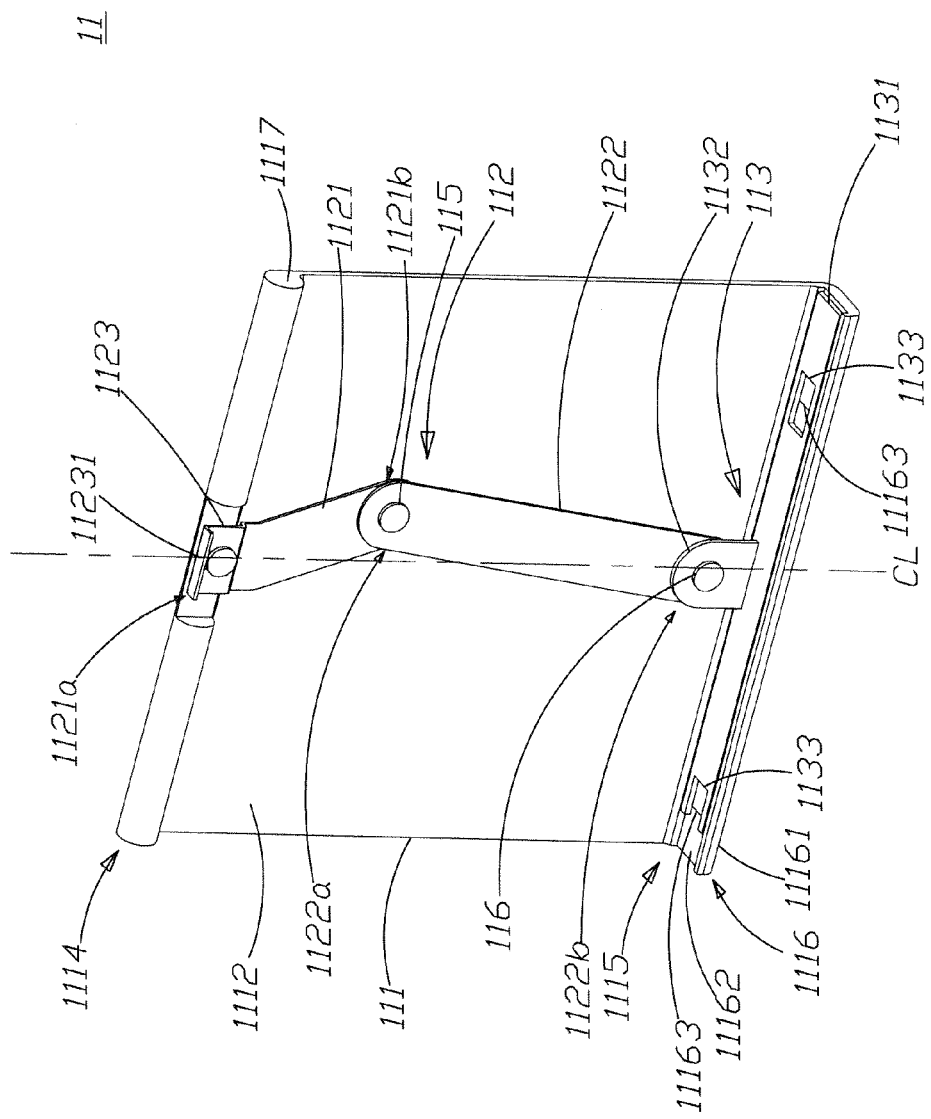
FIG. 2 shows a three-dimensional view of the connector according to the first embodiment of the present disclosure.

Please refer to FIG. 2, which shows a three-dimensional view of the connector according to the first embodiment of the present disclosure. As shown in the figure, the connector 11 according to the present embodiment has a connecting body 111 and an interlocking structure 112. The connecting body 111 has a first surface 1111 and a second surface 1112. The interlocking structure 112 is disposed on the second surface 1112 of the connecting body 111, and includes a first linkage 1121 and a second linkage 1122. The first linkage 1121 has a driving end 1121a and a first pivot end 1121b. The first linkage 1121 is disposed on the second surface 1112 of the connecting body 111. The driving end 1121a of the first linkage 1121 has a driving part 1123 located at the first end 1114 of the connecting body 111. The first pivot end 1121b if the first linkage 1121 faces the second end 1115 of the connecting body 111. The first linkage 1121 according to the present embodiment inclines to the right with respect to a central line CL of the connecting body 111. The central line CL passes through the first end 1114 and the second end 1115 of the connecting body 111. The second linkage 1122 has a second pivot end 1122a and a third pivot end 1122b. The second linkage 1122 is disposed on the second surface 1112 of the connecting body 111. The third pivot end 1122b of the second linkage 1122 is pivoted at a latch 113 located at the second end 1115 of the connecting body 111. The second pivot end 1122a of the second linkage 1122 faces the first end 1114 of the connecting body 111. A first pivot member 115 pivots the first pivot end 1121b of the first linkage 1121 and the second pivot end 1122a of the second linkage 1122, so that the second linkage 1122 can rotate with respect to the first linkage 1122. According to the present embodiment, the second linkage 1122 inclines to the left with respect to the central line CL of the connecting body 111.

The driving part 1123 of the present embodiment has a driving plate 11231 perpendicular to the second surface 1112 of the connector 11. Besides, the latch 113 comprises a latch body 1131 and a pivot plate 1132. The pivot plate 1132 is disposed perpendicular to the latch body 1131. A second pivot member 116 pivots the pivot plate 1132 and the third pivot end 1122b of the second linkage 1122. The pivot plate 1132 is perpendicular to the second surface 1112 of the connecting body 111; the latch body 1131 is perpendicular to the second surface 1112 of the connecting body 111. The latch body 1131 includes at least a positioning part 1133 with the extension direction parallel with the second surface 1112 of the connecting body 111. In addition, the positioning part 1133 of the present embodiment is a hole penetrating the latch body 1131.

The second end 1115 of the connecting body 111 according to the present embodiment has a carrying part 1116. which includes a carrying body 11161. The carrying body 11161 projects from the second surface 1112 of the connecting body 111 and is perpendicular to the second surface 1112 of the connecting body 111. The carrying body 11161 is located below the latch 113 for carrying the latch body 1131. According to the present embodiment, a guiding groove 11162 is located on the surface of the carrying body 11161 facing the latch body 1131 with the extension direction parallel with the second surface 1112 of the connecting body 111. The latch body 1131 is disposed in the guiding groove 11162, which can guide the latch body 1131 to move along the direction parallel with the second surface 1112 of the connecting body 111. Inside the guiding groove 11162, there is at least a hole 11163 corresponding to the positioning part 1133.

Figure 3:
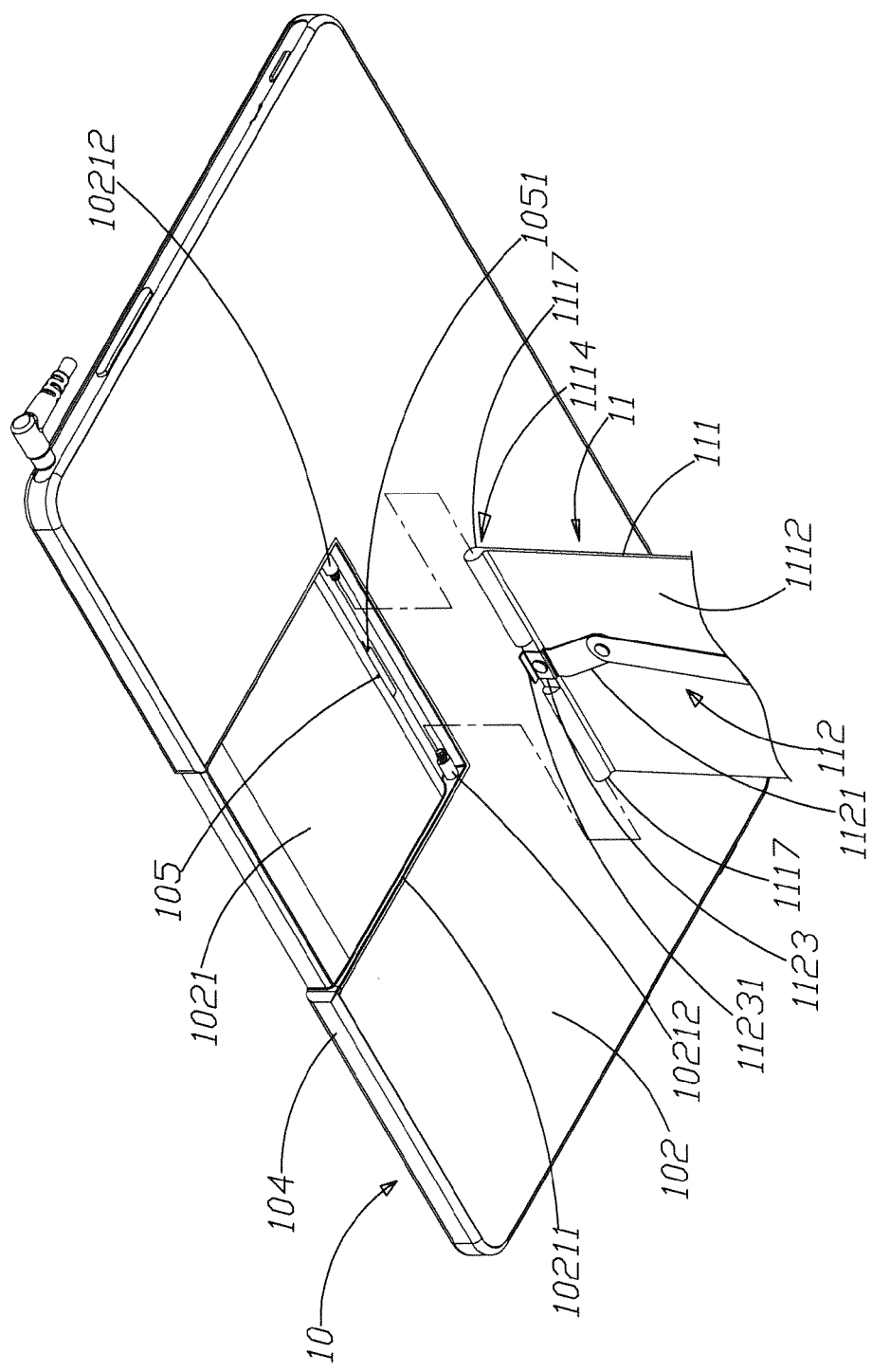
FIG. 3 shows an assembly view of the touch tablet and the connector according to the first embodiment of the present disclosure.

Please refer to FIG. 3, which shows an assembly view of the touch tablet and the connector according to the first embodiment of the present disclosure. As shown in the figure, the touch tablet 10 has a first surface 101 (as shown in FIG. 1A) and a second surface 102. The first surface 101 has a display area 103 (as shown in FIG. 1A); the second surface 102 has an accommodating recess 1021, which extends from the bottom side surface 104 of the touch tablet 10 to the inside. An activation part 105 is disposed at an end of the accommodating recess 1021 corresponding to the bottom side surface of the touch tablet 10. A first pivot part 10212 is located on the two sidewalls 10211 of the accommodating recess 1021, respectively. The activation part 105 is located between the two first pivot parts 10212. The activation part 105 according to the present embodiment is an activation plate 1051 parallel with the extension direction of the accommodating recess 1021. The first end 1114 of the connecting body 111 of the connector 11 has a second pivot part 1117. When the connector 11 is assembled to the touch tablet 10, the second surface 1112 of the connecting body 111 of the connector 11 faces the second surface 102 of the touch tablet 10. The second pivot part 1117 of the connector 11 is pivoted at the two first pivot parts 10212 of the touch tablet 10 to allow rotation of the connector 11 with respect to the touch tablet 10 and storage in the accommodating recess 1021. When the second pivot part 1117 of the connector 11 is pivoted at the two first pivot parts 10212 of the touch tablet 10, the driving part 1123 of the first linkage 1121 of the interlocking structure 112 is disposed at the activation part 105 of the touch tablet 10; and the driving plate 11231 of the driving part 1123 corresponds to the activation plate 1051 of the activation part 105. As the angle, which is the angle between the second surface 102 of the touch tablet 10 and the second surface 1112 of the connecting body 111) of the touch tablet 10 with respect to the connector 11 exceeds 90 degrees, the driving plate 11231 is driven by the activation plate 1051 for driving the interlocking structure 112.

Figure 4:
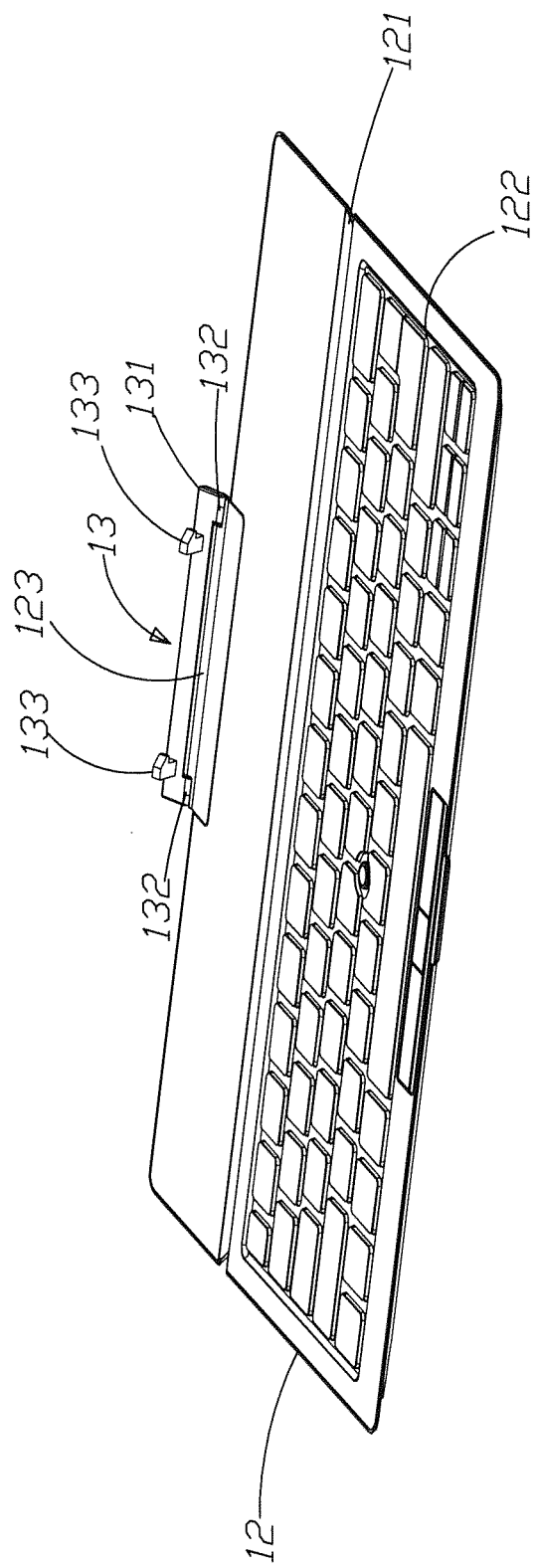
FIG. 4 shows a three-dimensional view of the keyboard dock according to the first embodiment of the present disclosure.

Please refer to FIG. 4, which shows a three-dimensional view of the keyboard dock according to the first embodiment of the present disclosure. As shown in the figure, the keyboard dock 12 has a third pivot part 123 located on one side thereof. A positioning member 13 is pivoted at the third pivot part 123 and comprises a positioning body 131. The positioning body 131 has two fourth pivot parts 132 pivoted at the third pivot part 123, respectively. When the positioning member 13 is pivoted at the keyboard dock 12, the positioning member 13 can rotate with respect to the keyboard dock 12. The positioning body 131 includes at least a positioning hook 133 facing upwards and extending in the direction away from the surface the keyboard dock 12 having the fixing part 121.

Figure 5:
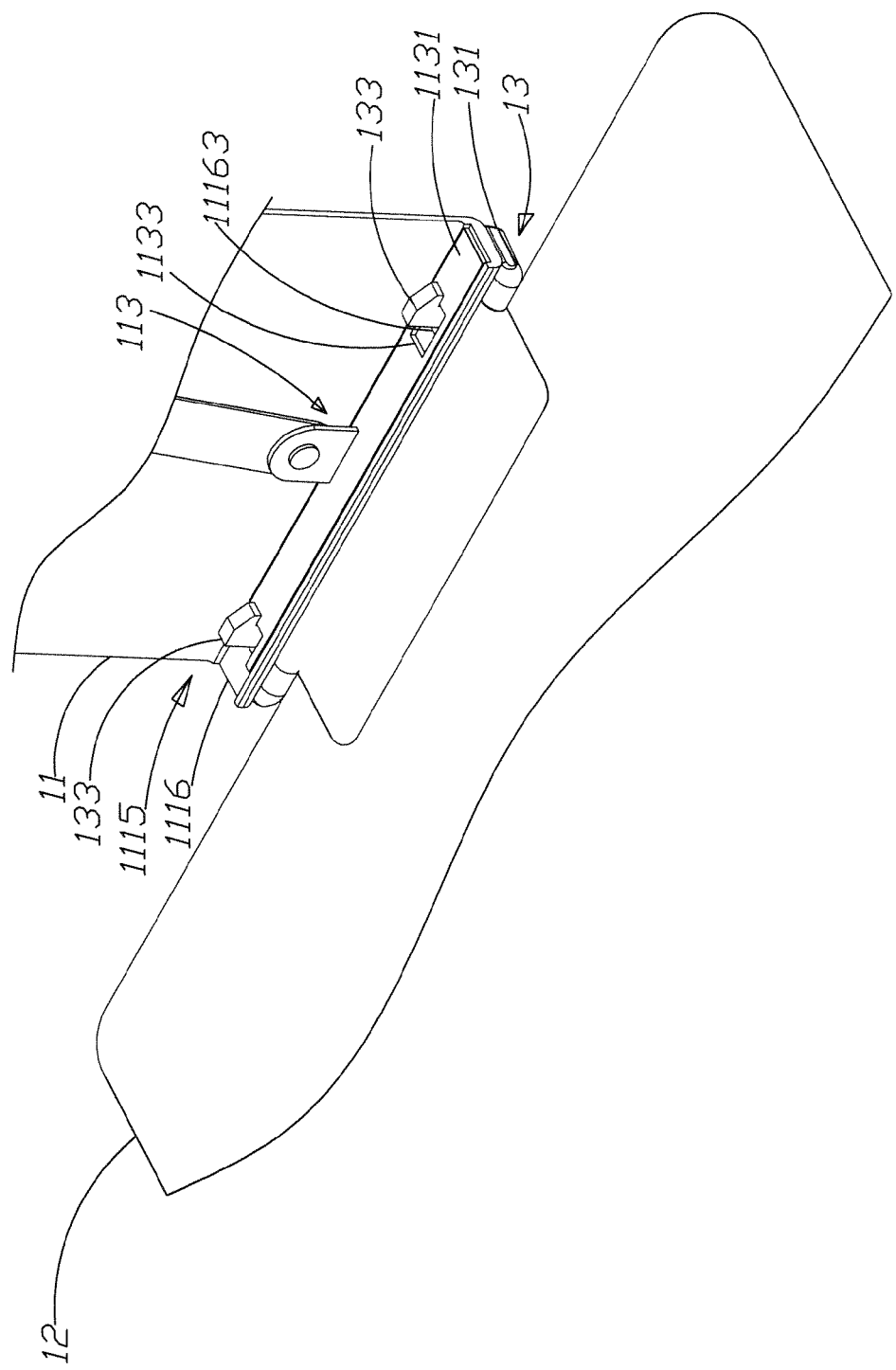
FIG. 5 shows an assembly view of the connector and the keyboard dock according to the first embodiment of the present disclosure.

Please refer to FIG. 5, which shows an assembly view of the connector and the keyboard dock according to the first embodiment of the present disclosure. As shown in the figure, when the connector 11 is disposed at the keyboard dock 12, the carrying part 1116 at the second end 1115 of the connector 11 is disposed on the positioning body 131 of the positioning member 13. The positioning hook 133 passes through the hole 11163 located at the carrying part 1116 and the positioning part 1133 of the latch 113 and hooks the latch body 1131 of the latch 113.

Figure 6:
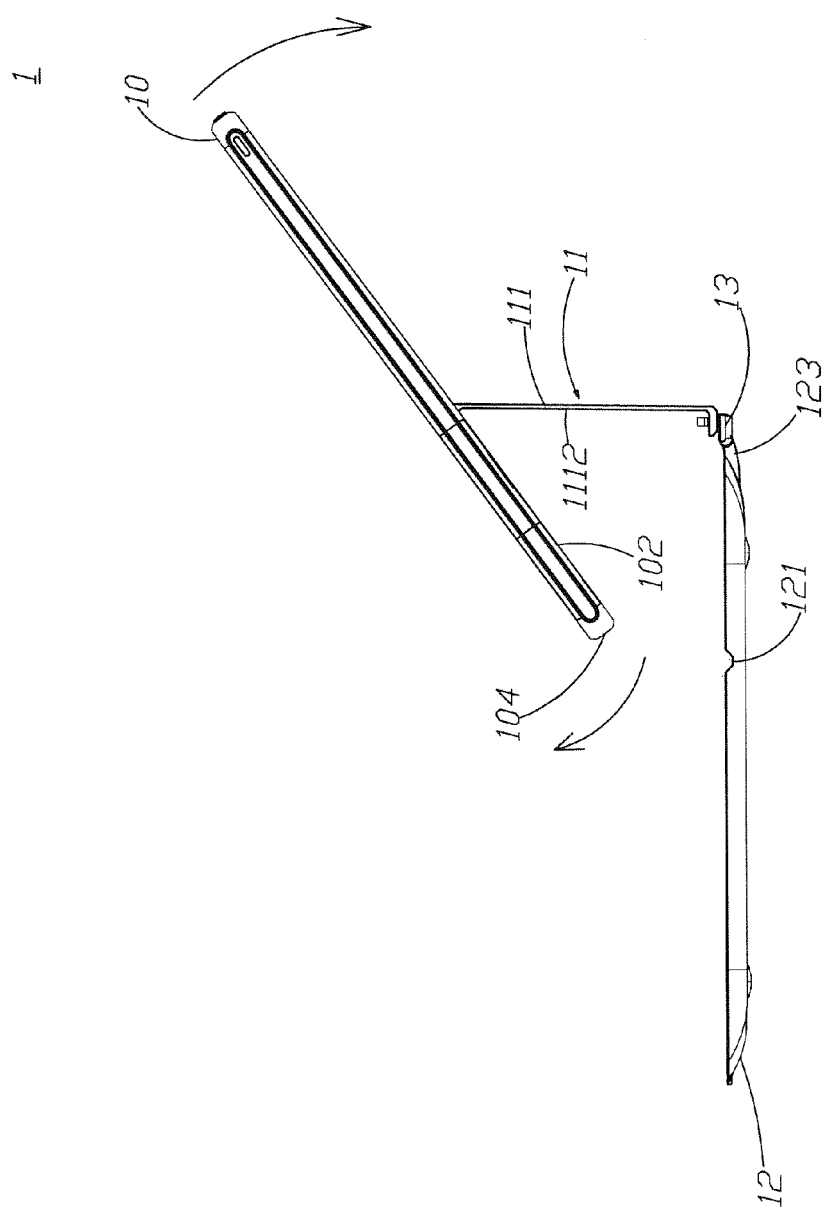
FIG. 6 shows a usage status diagram of the touch notebook computer according to the first embodiment of the present disclosure.

The touch tablet 10 is assembled on the keyboard dock 12 to form the touch notebook computer 1. While not using the touch notebook computer 1, the touch tablet 10 covers the keyboard dock 12. In other words, the first surface 101 of the touch tablet 10 is parallel with the surface of the keyboard dock 12 having the fixing part 121. The connector 11 is contained in the accommodating recess 1021 of the touch tablet 10. That is to say, the second surface 1112 of the connecting body 111 of the connector 11 is parallel with the bottom surface of the accommodating recess 1021. Please refer to FIG. 6. While using the touch notebook computer 1, the touch tablet 10 is lifted. The connector 11 rotates with respect to the keyboard dock 12, which drives the positioning member 13 to rotate with respect to the keyboard dock 12. The angle between the connector 11 and the keyboard dock 12 extends to an angle. When the positioning member 13 is blocked by the third pivot part 123 of the keyboard dock 12, the positioning member 13 stops rotating with respect to the keyboard dock 12. Thereby, the connector 11 stops rotating with respect to the keyboard dock 12. Then, the touch tablet 10 rotates with respect to the connector 11. Namely, the bottom side surface 104 of the touch tablet 10 rotates in the direction away from the connector 11 to make the angle between the touch tablet 10 and the connector 11 less than or equal to 90 degrees. The angle is the second surface 102 of the touch tablet 10 and the second surface 1112 of the connecting body 111 of the connector 11. Next, the bottom side surface 104 of the touch tablet 10 is placed in the fixing part 121 of the keyboard dock 12. The keyboard dock 12 can support the touch tablet 10 and allows the user to touch control and view the display area 103 of the touch tablet 10 (as shown in FIGS. 1A and 1B). The user can is the keyboard 122 of the keyboard dock 12 or any other input device to input at least an input signal to the touch tablet 10 for controlling the content displayed in the display area 103 of the touch tablet 10.

Figure 7A:
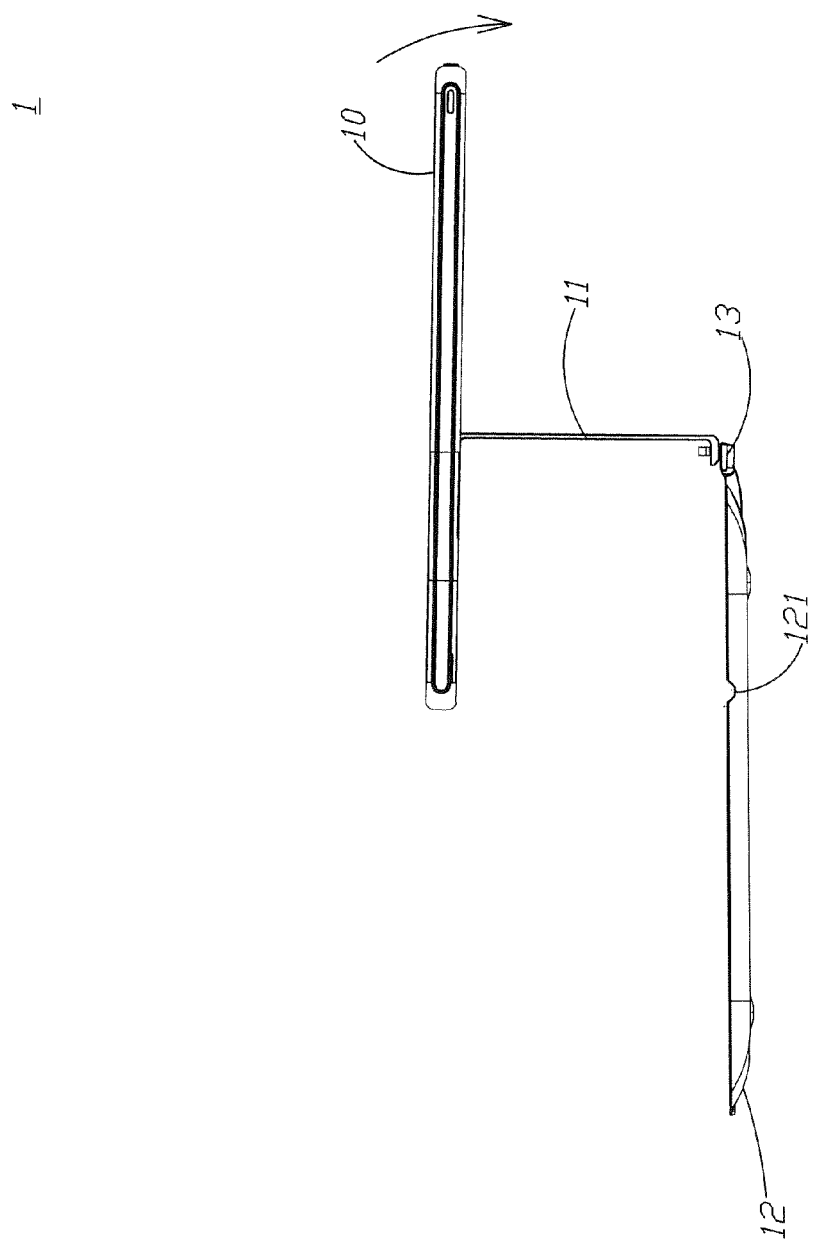

Please refer to FIGS. 7A to 7D. When a user wishes to use the touch tablet 10 alone, he can detach the touch tablet 10 from the keyboard dock 12. First, the touch tablet 10 is moved away from the fixing part 121 of the keyboard dock 12. The connector 11 rotates with respect to the keyboard dock 12. When the angle between the connector 11 and the keyboard dock 12 reaches 90 degrees, the connector 11 stop rotating with respect to the keyboard dock 12, as shown in FIG. 7A.

Figure 7C:
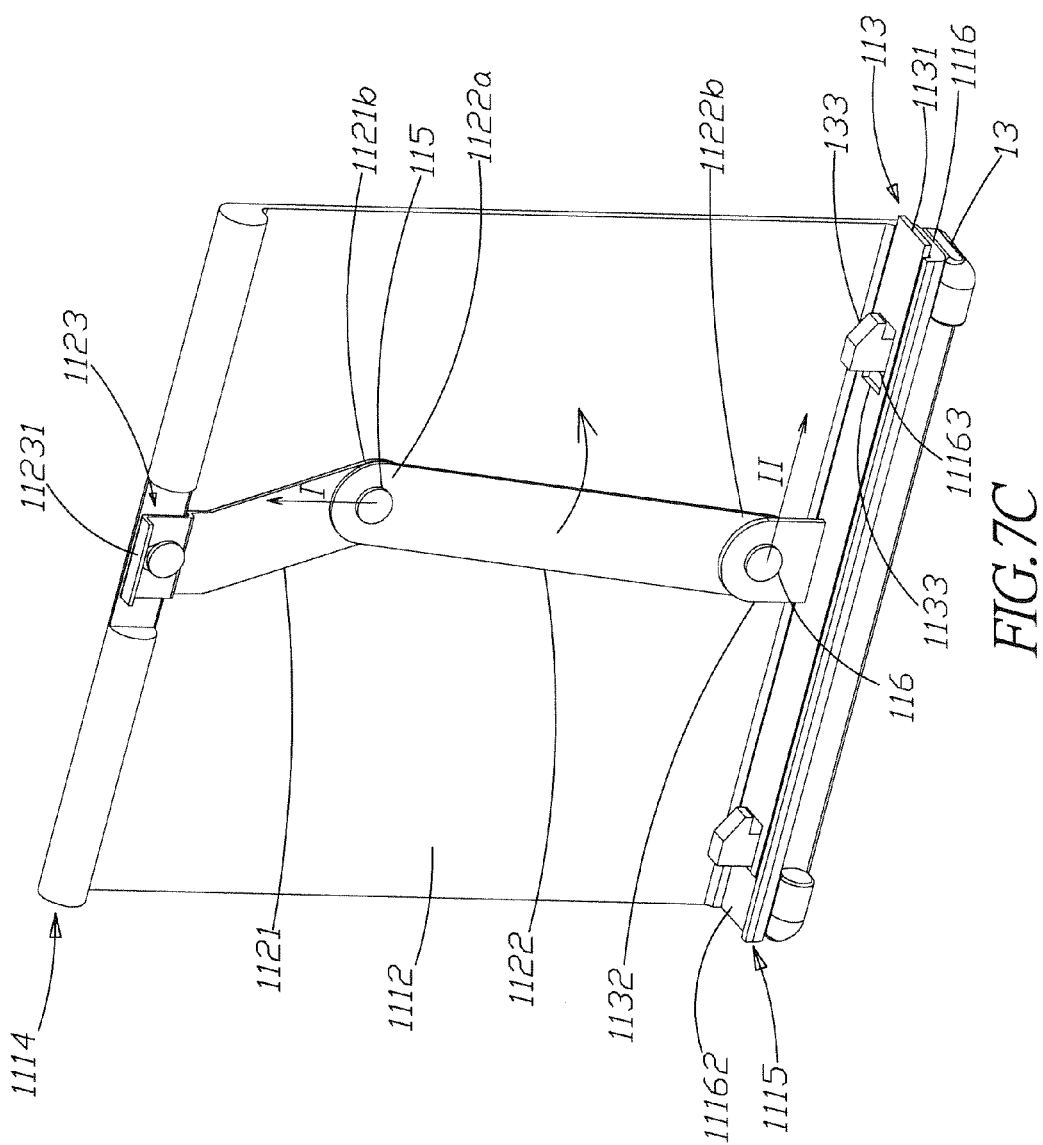

Next, the touch table 10 rotates with respect to the connector 11. When the angle between the touch tablet 10 and the connector 11 exceeds 90 degrees, the activation plate 1051 of the activation part 105 of the touch tablet 10 presses against the driving plate 11231 of the driving part 1123 of the interlocking structure 112 of the connector 11. Meanwhile, the activation plate 1051 drives the driving plate 11231 to move towards a first direction I, as shown in FIG. 7B. The driving plate 11231 drives the first linkage 1121 to move towards the first direction I. The first linkage 1121 drives the second pivot end 1122a of the second linkage 1122 to move towards the first direction I. The second linkage 1122 rotates with respect to the first linkage 1121. The third pivot end 1122b of the second linkage 1122 drives the latch body 1131 of the latch 113 to move in a second direction II perpendicular to the first direction I, so that the positioning hook 133 of the positioning member 13 disposed at the keyboard dock 12 can detach from the latch body 1131 of the latch 113. At the same time, the positioning hook 133 comes off from the hole 11163 of the carrying part 1116 of the connector 11 and from the positioning part 1133 of the latch 113 for separating the connector 11 from the positioning member 13 at the keyboard dock 12. Consequently, the touch tablet 10 is detached from the keyboard dock 12, as shown in FIG. 7C.

Figure 7D:
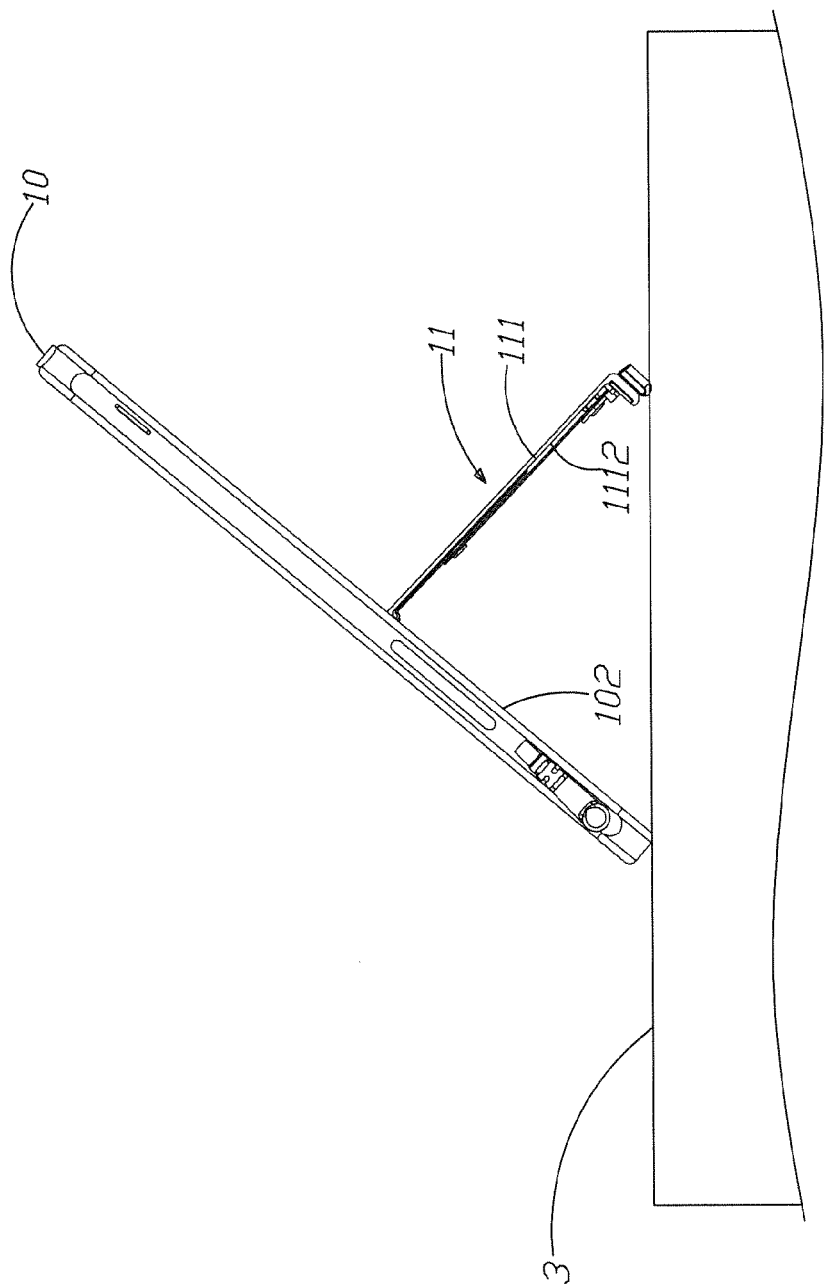

Furthermore, the connector 11 can rotate an angle with respect to the touch tablet 10. The angle is the angle between the second surface 102 of the touch tablet 10 and the second surface 1112 of the connecting body 111. When the touch tablet 10 is disposed on a plane 3, the connector 11 can support the touch tablet 10 to be placed on the plane 3. The user can adjust the angle between the connector 11 and touch tablet 10 for adjusting the angle for touch controlling and viewing the touch tablet 10, as shown in FIG. 7D.

Figure 8:
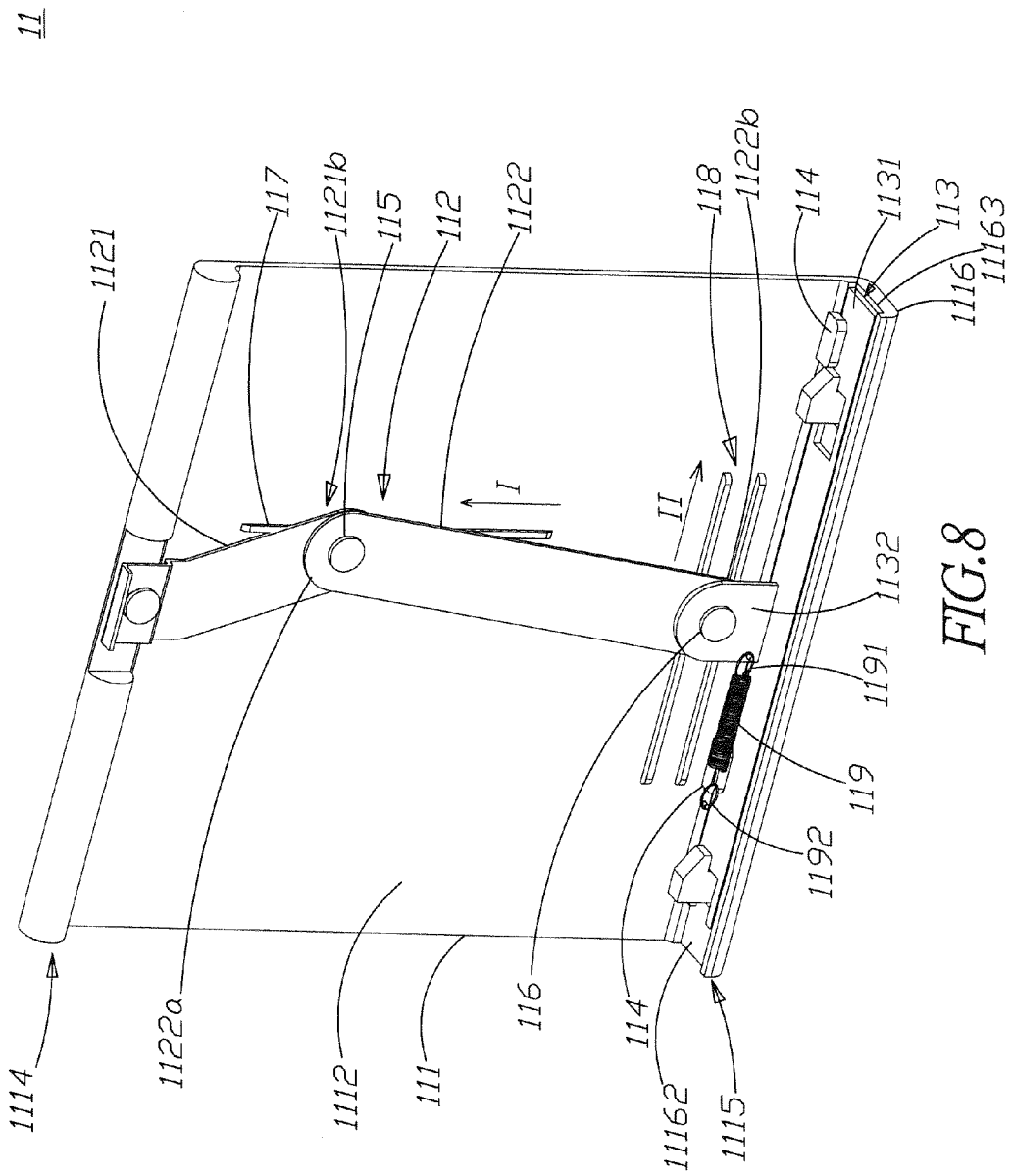
FIG. 8 shows a three-dimensional view of the connector according to the second embodiment of the present disclosure.

Please refer to FIG. 8, which shows a three-dimensional view of the connector according to the second embodiment of the present disclosure. As shown in the figure, in order to make the first linkage 1121 of the interlocking structure 112 drive the second pivot end 1122a of the second linkage 1122 to move towards the first direction I, a first limiting structure 117 is further disposed on the second surface 1112 of the connecting body 111. The extension direction of the first limiting structure 117 is parallel with the first direction I. The first pivot end 1121b of the first linkage 1121 pivoted at the interlocking structure 112 and the first pivot member 115 of the second pivot end 1122a of the second linkage 1122 are disposed at the first limiting structure 117. When the first linkage 1121 drives the second pivot end 1122a of the second linkage 1122 to move towards the first directions I, the first pivot member 115 moves on the first limiting structure 117, which confines the second pivot end 1122a of the second linkage 1122 to move in the first direction I.

In addition, a second limiting structure 118 is further disposed on the second surface 1112 of the connecting body 111. The extension direction of the second limiting structure 118 is parallel with the second direction II. The third pivot end 1122b pivoted at the second linkage 1122 and the second pivot member 116 of the pivot plate 1132 of the latch 113 are disposed at the second limiting structure 118. When the first linkage 1121 drives the second pivot end 1122a of the second linkage 1122 to move towards the first directions I, the second linkage 1122 rotates with respect to the first linkage 1121. At this time, the second pivot member 116 moves on the second limiting structure 118, which confines the third pivot end 1122b of the second linkage 1122 to move in the first direction I. Thereby, the third pivot end 1122b of the second linkage 1122 drives the latch 113 to move in the second direction II.

The first and second limiting structures 117, 118 according to the present embodiment comprises two projective bars, respectively. The two projective bars are arranged at intervals and parallel with each other. The extension direction of the two projective bars of the first limiting structure 117 is parallel with the first direction I; the extension direction of the two projective bars of the second limiting structure 118 is parallel with the second direction II.

Besides, the first and second pivot members 115, 116 according to the present embodiment are projective pillars, respectively, disposed between the two limiting projective bars of the first limiting structure 117 and the two limiting projective bars of the second limiting structure 118, respectively. Alternatively, the first limiting structure 117, the second limiting structure 118, the first pivot member 115, and the second pivot member 116 can be other structures. The details will not be described further.

Moreover, at least a blocking part 114 is further disposed at the second end 1115 of the connecting body 111 of the connector 11. The blocking part 114 is located above the guiding groove 11162. The latch body 1131 of the latch 113 is located between the carrying part 1116 and the blocking part 114 for blocking the latch body 1131 of the latch 113 disposed in the guiding groove 11162, and thus preventing the latch body 1131 from coming off from the guiding groove 11162 and confining the latch body 1131 to move in the second direction II.

In addition, a recovery member 119 is further disposed between the second linkage 1122, or the latch 113, and the connecting body 111. The recovery member 119 includes a first end 1191 and a second end 1192. The first end 1191 of the recovery member 119 can be fixed to the pivot plate 1132 of the latch 113; the second end 1192 of the recovery member 119 is fixed on the second surface 1112 of the connecting body 111. When the third pivot end 1122*b* of the second linkage 1122 drives the latch 113 to move towards the second direction II, the recovery member 119 is stretched by the latch 119, generating a recovery force. When the second linkage 1122 stops driving the latch 113 to move towards the second direction II, the recovery force of the recovery member 119 drives the latch 113 to recover to the original position. The recovery member 119 according to the present disclosure is a spring. Alternatively, the recovery member 119 can be an elastic member or other devices having recovery force.

To sum up, the present disclosure provides a detachable touch notebook computer. According to the touch notebook computer of the present disclosure, the touch tablet is detached from the keyboard dock by rotating the touch tablet for driving the interlocking structure of the connector. The interlocking structure drives the latch and disengages the locked status between the latch and the positioning member of the keyboard dock. The structures of the connector and the positioning member are simple, facilitating assembling of the connector to the positioning member. Thereby, the assembling of the touch tablet to the keyboard dock is easy. According to the touch notebook computer of the present disclosure, the touch tablet is detached from the keyboard dock by using simple operations for disengaging the locked status between the latch and the positioning member. Consequently, the effect of easy detachment can be achieved.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. A detachable touch notebook computer, comprising:
 a keyboard dock;
 a positioning member, pivoted on one side of said keyboard dock;
 a touch tablet, assembled on said keyboard dock, having an accommodating recess, and said accommodating recess having an activation part;
 a connector, having a first end and a second end, said first end pivoted in said accommodating recess of said touch tablet and having an interlocking structure, and said interlocking structure having a driving part corresponding to said activation part; and
 a latch, disposed at said second end of said connector, connected with said interlocking structure, and said positioning member disposed at said latch;
 wherein said accommodating recess includes two first pivot parts on the sidewalls of both sides, respectively; said activation part is located between said two first pivot parts; said first end of said connector includes at least a second pivot part; and said second pivot part is interlocked with one of said two first pivot parts;
 wherein said touch tablet rotates with respect to said connector; said activation part presses against said driving plate of said driving part; said driving part drives said interlocking structure, said interlocking structure drives said latch; said positioning member detaches from said latch; and said touch tablet detaches from said keyboard dock.

2. The detachable touch notebook computer of claim 1, wherein said connector comprises a connecting body, having a first surface and a second surface, said second surface facing said touch tablet, and said interlocking structure disposed on said second surface.

3. The detachable touch notebook computer of claim 2, wherein said interlocking structure comprises:
 a first linkage, disposed on said second surface, having a driving end and a first pivot end, said driving part located at said driving end and disposed at said first end of said connecting body, said first pivot end facing said second end of said connecting body, and said first linkage inclining with respect to a central line of said connecting body; and
 a second linkage, disposed on said second surface, having a second pivot end and a third pivot end, said latch pivoted at said third pivot end and located at said second end of said connecting body, said second pivot end facing said first end of said connecting body and pivoted at said first pivot end, and said second linkage inclining with respect to said central line of said connecting body.

4. The detachable touch notebook computer of claim 3, wherein said latch comprises:
 a latch body, perpendicular to said second surface of said connecting body, having a positioning part, and said positioning member disposed at said positioning part; and
 a pivot plate disposed perpendicular to said latch body, and pivoted at said third pivot end of said second linkage.

5. The detachable touch notebook computer of claim 4, and further comprising:
 a first pivot member, pivoted at said first pivot end of said first linkage and said second pivot end of said second linkage; and
 a second pivot member, pivoted at said third pivot end of said second linkage and said pivot plate of said latch.

6. The detachable touch notebook computer of claim 5, and further comprising:
 a first limiting structure, disposed on said second surface of said connecting body, having extension direction parallel with a first direction, said first pivot member disposed at said first limiting structure, and said first limiting structure confining said first pivot member to move in said first direction.

7. The detachable touch notebook computer of claim 6, and further comprising:
- a second limiting structure, disposed on said second surface of said connecting body, having extension direction parallel with a second direction, said second pivot member disposed at said second limiting structure, and said second limiting structure confining said second pivot member to move in said second direction.

8. The detachable touch notebook computer of claim 4, wherein said positioning member comprises a positioning body having at least a positioning hook disposed at said positioning part of said latch body.

9. The detachable touch notebook computer of claim 8, wherein said keyboard dock includes at least a third pivot part on one side; said positioning body includes at least a fourth pivot part; and said third pivot part is pivoted at said fourth pivot part.

10. The detachable touch notebook computer of claim 8, wherein said connecting body includes a carrying part at said second end of said connecting body; and said carrying part is located below said latch and carries said latch body.

11. The detachable touch notebook computer of claim 10, wherein said carrying part includes a carrying body, having at least a hole corresponding said positioning part, located between said positioning member and said latch body, and said positioning hook passing said hole and disposed at said positioning part of said latch body.

12. The detachable touch notebook computer of claim 11, wherein said carrying body includes a guiding groove and said latch body is disposed in said guiding groove.

13. The detachable touch notebook computer of claim 12, wherein said connecting body includes at least a blocking part at said second end; and said blocking part is located on said guiding groove and against said latch body.

14. The detachable touch notebook computer of claim 4, wherein said activation part includes an activation plate; said driving part includes a driving plate; said touch tablet rotates with respect to said connector; the angle between said touch tablet and connector is greater than 90 degrees; said activation plate presses against said driving plate; said driving plate drives said first linkage to move towards a first direction; said first linkage drive said second pivot end of said second linkage to move towards said first direction; said second linkage rotates with respect to said first linkage; said third pivot end of said second linkage drives said latch to move towards a second direction; and said positioning member detaches from said latch.

15. The detachable touch notebook computer of claim 1, and further comprising:
- a recovery member, connecting said connecting body and said latch.

* * * * *